Sept. 2, 1947.   E. E. WESSELHOFF   2,426,960
CHAIN DRIVE
Filed Aug. 3, 1944   3 Sheets-Sheet 2

Inventor:
Ernest Earl Wesselhoff
By Leonard C. Pritzlaugh
Atty.

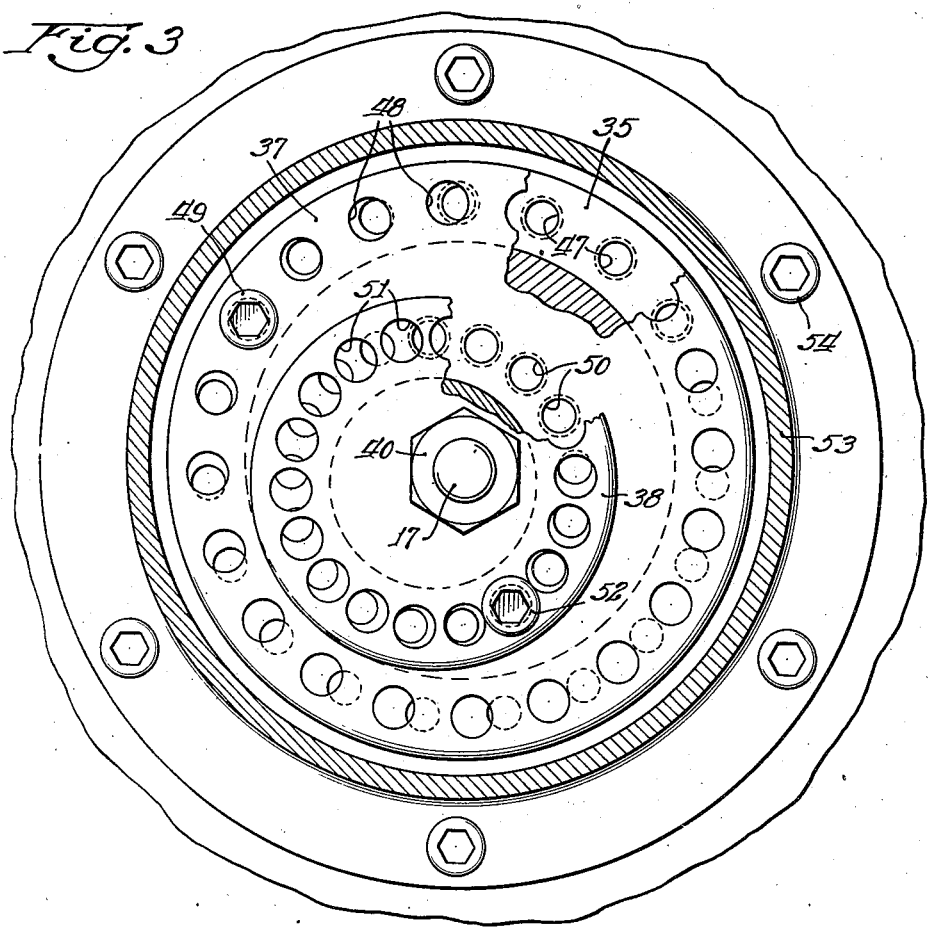

UNITED STATES PATENT OFFICE 2,426,960

CHAIN DRIVE

Ernest Earl Wesselhoff, Boston, Mass., assignor to Morse Chain Company, Ithaca, N. Y., a corporation of New York Application August 3, 1944, Serial No. 547,869

10 Claims. (Cl. 74—217)

My invention relates to power transmitting mechanisms and more particularly to chain drive mechanisms.

In yarn spinning machines, a pair of shafts carrying mandrels for the yarn are driven from various other shafts. In order to control the quality of the yarn and in particular its thickness, it is necessary to vary the speed ratio between the mandrel shafts and the other shafts. It is an object of my invention to provide an improved power transmitting mechanism between the shafts which may be easily adjusted to vary the speed ratio.

The power transmitting trains between these shafts may include three shafts, the first and the third of which each carries a wheel and the second of which carries two wheels connected together. The wheel on the first shaft is connected in driving relation with one of the pair of wheels on the second shaft and the other wheel on the second shaft is connected in driving relation with the wheel on the third shaft. The sizes of these wheels may be changed in order to vary the speed ratio between the first shaft and the third shaft, and it is an object of my invention to provide an improved arrangement for mounting the second shaft with respect to the first and third shafts so that both of the wheels on the second shaft are maintained in driving relation with the wheels on the first and third shafts regardless of the change in size of the wheels. In my preferred construction these wheels are preferably sprockets and have driving chains extending around them, and it is contemplated that the second shaft shall be so adjustably movable that when a change in size of the sprockets is made, these chains will be maintained taut.

More particularly it is an object of my invention to provide an improved adjusting mechanism for moving the second shaft with respect to the first and the third shafts which comprises an outer eccentric rotatably disposed in a stationary casing and an inner eccentric rotatably disposed in the outer eccentric and carrying the second shaft, and it is still another object of my invention to provide a vernier mechanism effectively between the casing and the outer eccentric and a vernier mechanism effectively between the two eccentrics whereby the inner eccentric may be set in a plurality of positions with respect to the outer eccentric and the outer eccentric may be set in a plurality of positions with respect to the stationary casing, so that the second shaft may thereby be set in a great number of different positions for maintaining both driving chains taut regardless of the changes in size of the sprockets.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 3 is a sectional view taken on line 3—3 of Fig. 2.

Like characters of reference designate like parts in the several views.

Figure 1:
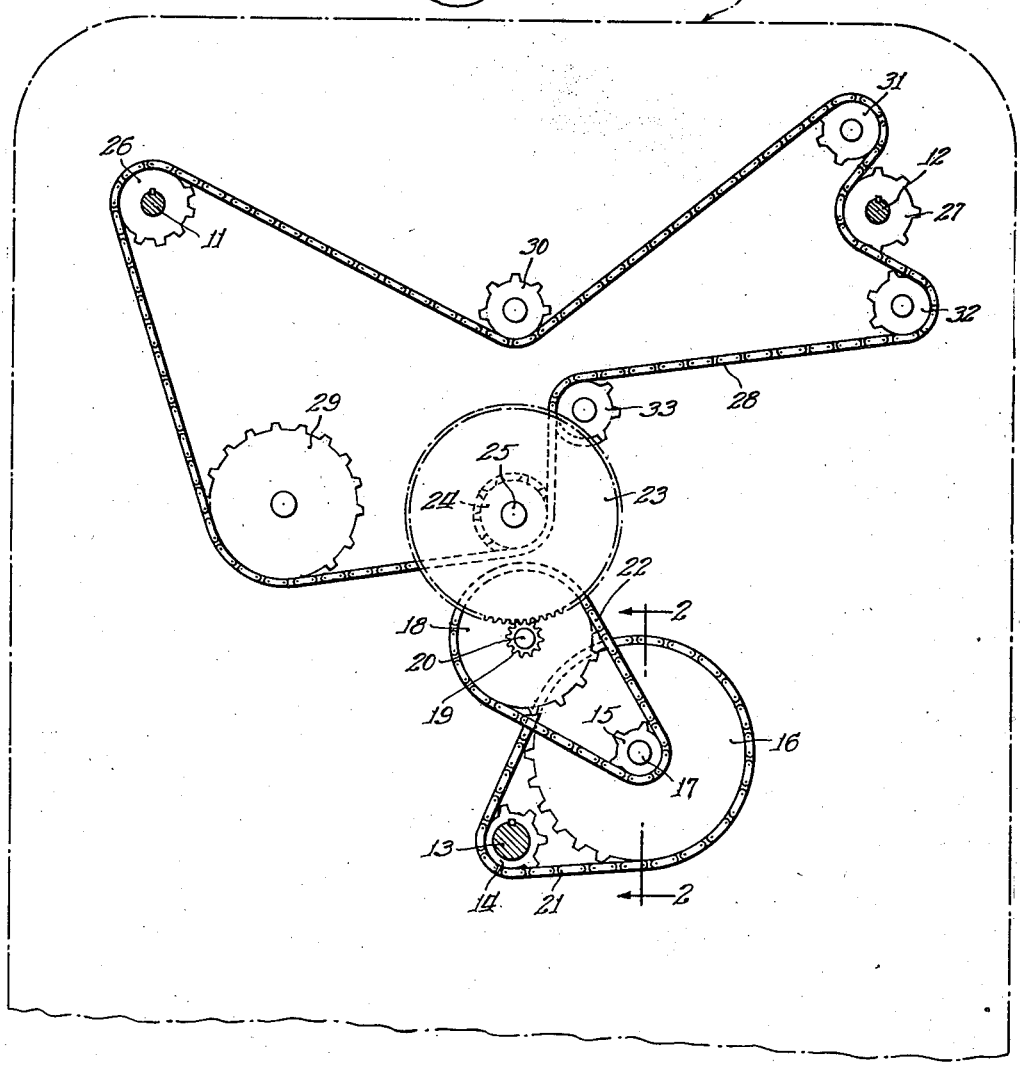
Fig. 1 is an elevational view of the head end of a thread spinning machine embodying the principles of the invention.

Referring now to the drawings, the head end 10 of the illustrated thread spinning machine carries driven shafts 11 and 12 and a driving shaft 13. The two driven shafts are connected to drive suitable mandrels (not shown) for the thread processed by the machine, and the shaft 13 is driven by any suitable prime mover (not shown) and is also connected with other driven parts (not shown) of the spinning machine. In order to vary the quality of thread and particularly the thickness of the thread spun by the machine, it is necessary to vary the speed ratio at which the shafts 11 and 12 are driven with respect to the shaft 13. The thread spinning machine comprises mechanism for transmitting power from the driving shaft 13 and to the driven shafts 11 and 12, and this mechanism is such that the speed ratio between the shafts may be easily changed. The power transmitting mechanism will now be described.

The power transmitting mechanism between these shafts comprises a wheel 14 having cogs on its periphery whereby to constitute a sprocket wheel and fixed on the shaft 13 to be driven thereby, a pair of similar sprocket wheels 15 and 16 which are fixed together and are disposed on a shaft 17 and a similar sprocket wheel 18 fixed with respect to a gear 19 and disposed on a shaft 20 along with the gear. An endless chain 21 extends around the sprocket wheels 14 and 16 to put the wheels in driving relation, and an endless chain 22 extends around the sprocket wheels 15 and 18 to put the latter wheels in driving relation. The gear 19 is in mesh with a gear 23 which is connected with a sprocket wheel 24 and is disposed on a shaft 25 along with the wheel 24. The driven shaft 11 has fixed thereto a sprocket wheel 26, and the driven shaft 12 has fixed thereto a sprocket wheel 27. An endless chain 28 extends around the sprocket wheels 24, 26 and 27 to put these wheels in driving relation, and a plurality of idler wheels 29, 30, 31, 32 and 33 are carried by the head 10 and operate on the chain 28 to hold the chain in the configuration shown in the drawings for maintaining it in proper engagement with the sprocket wheels 24, 26 and 27. In operation of the chain drive mechanism just described, the shaft 13 and sprocket wheel 14 drives the wheels 16 and 15 and the latter wheel drives the wheel 18 and gear 19. The gear 19 drives the gear 23 and sprocket 24, and this sprocket drives the sprockets 26 and 27 and thereby the shafts 11 and 12 by means of the chain 28.

In order to change the speed ratio between the driving shaft 13 and the driven shafts 11 and 12, the sizes of the gears 19 and 23 may be changed, and in the event it is necessary to change the distance between the shafts 20 and 25, any suitable means (not shown) may be provided for allowing this to be done. The sizes of the sprockets 14, 15, 16 and 18 may also be changed in order to change the speed ratio, and if it is necessary to change the location of the shaft 17 with respect to the shafts 13 and 20 so that the chains 21 and 22 may be kept taut to maintain the sprockets in proper driving relation, this may be done by means of my improved shaft adjusting mechanism which will now be described.

Figure 2:
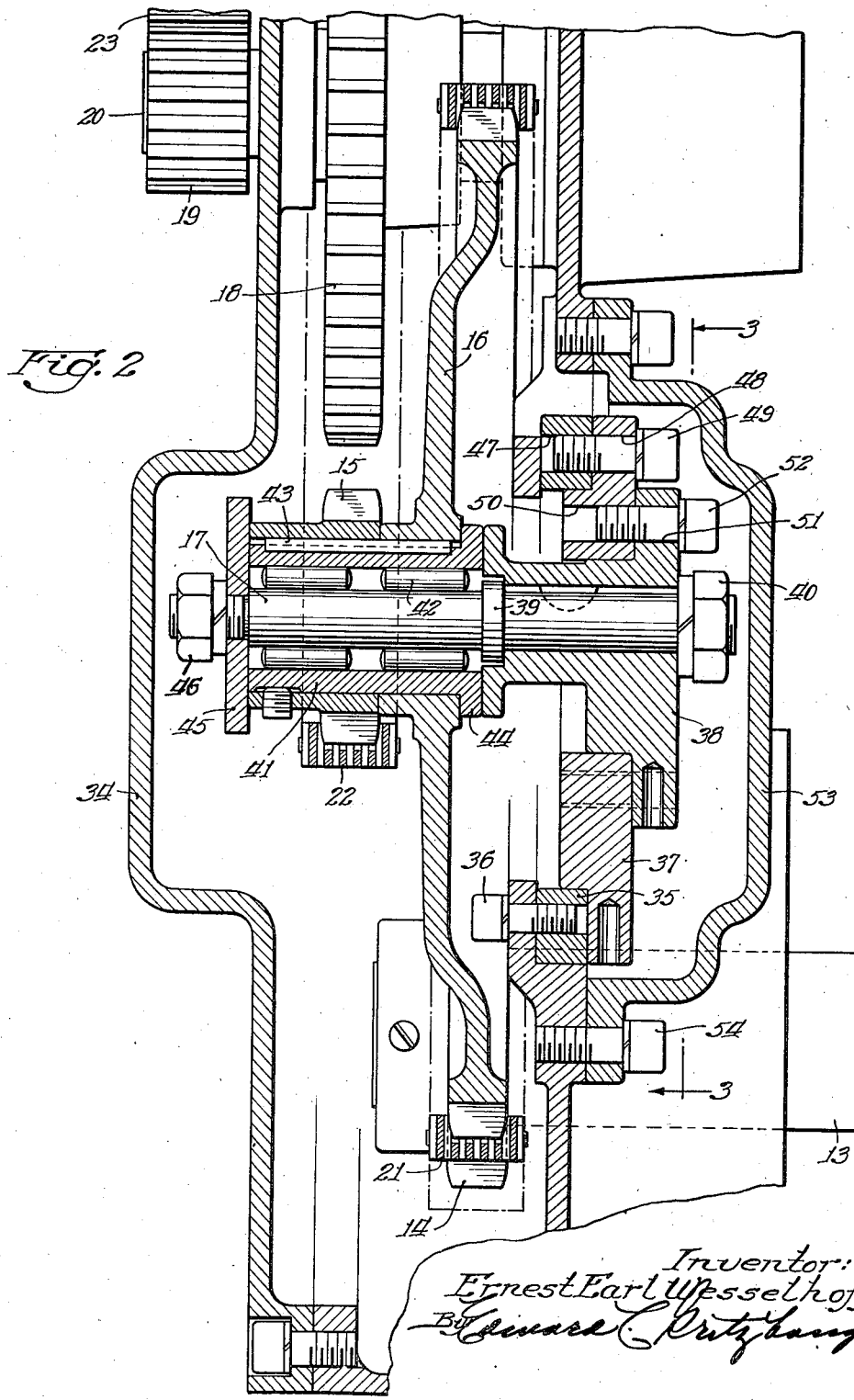
Fig. 2 is a sectional view on an enlarged scale taken on line 2—2 of Fig. 1.

Referring now in particular to Figs. 2 and 3 of the drawings, the head end 10 comprises a casing portion 34 which carries all three of the shafts 13, 17 and 20. The shaft 17 is carried with respect to the casing portion 34 by means of an annular member 35 which is fixed to the casing portion by screws 36. An eccentric 37 is disposed in the member 35, and a second eccentric 38 is disposed within the eccentric 37. The shaft 17 extends through the eccentric 38 and is keyed thereto, as shown, and the shaft is fixed with respect to the eccentric by a shoulder 39 on the shaft and a nut 40 screwed on the shaft. A roller bearing is provided on the outer end of the shaft, and this bearing comprises a cylindrical hub 41 and rollers 42 disposed between the hub and the shaft. A key 43 is provided on the hub 41, and both of the sprockets 15 and 16 are disposed on the hub and are provided with keyways for receiving the key 43. The hub 41 is provided with a shoulder 44 on one end which engages with the eccentric 38 and which prevents movement of the sprockets 15 and 16 off this end of the hub. The sprockets 15 and 16 may, however, be removed from the hub 41 from its other end for replacing the sprockets with others of different size, and the sprockets are removably held in place on the hub by a washer 45 on the shaft 17 and a nut 46 acting on the washer.

The eccentric 37 is rotatably disposed in the annular member 35 fixed to the casing portion 34, and the eccentric is thus in effect rotatable within an opening provided in the stationary head end 10. The eccentric 38 is rotatable within the opening in the eccentric 37. By suitable adjustment of the outer eccentric 37 within the member 35 and adjustment of the inner eccentric 38 within the outer eccentric 37, the shaft 17 may be positioned suitably to take up slack in both of the chains 21 and 22 upon a change of the sizes of any or all of the sprockets 14, 15, 16 and 18. The double eccentric arrangement not only allows the shaft 17 to be adjustably moved toward or away from the shaft 13 but the arrangement also allows the shaft 17 to be simultaneously moved toward or away from the shaft 20 in accomplishing this result.

A vernier arrangement is provided for holding the eccentric 37 in a great number of different rotative positions within the annular member 35, and a similar vernier arrangement is provided for holding the eccentric 38 in a great number of different rotative positions within the eccentric 37.

The vernier arrangement between the eccentric 37 and the annular member 35 is provided by a plurality of equally spaced threaded openings 47 formed in the member 35 and a plurality of equally spaced openings 48 provided in the eccentric 37. Any of the openings 48 may coincide with any of the openings 47, depending on the rotative position of the eccentric 37 in the annular member 35. There are a different number of openings 47 than of the openings 48, and preferably the number of openings 47 differs from the number of openings 48 by only one. In the illustrated embodiment of the invention, there are nineteen equally spaced openings 47 while there are twenty equally spaced openings 48. A screw 49 is provided which may extend through any of the openings 48 and into any of the threaded openings 47 coincident therewith for fixing the eccentric 37 from rotative movement within the annular member 35, after the eccentric has been positioned as desired in the member 35. The arrangement of the openings 47 and 48 in the eccentric 37 and annular member 35 allows the eccentric 37 to be fixed in a multitude of different rotative positions within the member 35, due to the fact that each of the openings 48 may be made to coincide with each of the openings 47, and due to the fact that with each pair of coinciding openings 47 and 48, the eccentric 37 is in a different rotative position.

A similar vernier arrangement is provided between the eccentrics 37 and 38. This vernier arrangement is provided by threaded openings 50 provided in the eccentric 37 and other openings 51 provided in the eccentric 38. As with the other vernier arrangement between the members 35 and 37, any of the openings 51 may be made to coincide with any of the openings 50, depending on the rotative position of the eccentric 38 in the eccentric 37, and the number of openings 50 differs from the number of openings 51, preferably by only one. In the illustrated embodiment of the invention, there are seventeen openings 50 and there are eighteen openings 51. A screw 52 is provided for extending through any of the openings 51 and into any of the threaded openings 50 coincident therewith for holding the eccentric 38 fixed with respect to the eccentric 37 in any of a multitude of rotative positions therein. A cap 53 may be provided over the eccentrics 37 and 38 and may be so positioned after the shaft 17 has been properly set for the desired speed ratio between the driving shaft 13 and the driven shafts 11 and 12. The cap 53 is fixed to the casing portion 34 by means of screws 54.

The vernier adjusting mechanism between the annular member 35 and the eccentric 37 allows the eccentric to be fixed relative to the stationary casing portion in many different rotative positions, and the vernier adjusting mechanism between the two eccentrics 37 and 38 allows the latter eccentric to be fixed relative to the eccentric 37 in many different rotative positions. By setting both vernier adjusting mechanisms properly, the shaft 17 may be set, with a change of any or all of the sprockets 14, 15, 16 and 18, so that both of the chains 21 and 22 are taut about the sprockets.

It will be apparent to those skilled in the art that changes may be made without departing from the principles of the invention. The sprockets 14, 15, 16 and 18 could have gears substituted for them, for example, and the invention could, of course, be used with machinery other than a thread spinning machine. I wish it to be understood, therefore, that my invention is not to be limited to the specific constructions and arrangements shown and described, except only insofar as the claims may be so limited.

I claim:

1. In power transmitting mechanism, the combination of a pair of spaced shafts, a wheel on each of said shafts, means interconnecting said wheels and effective to put the wheels in driving relation to each other when the wheels are of predetermined sizes and said shafts are a predetermined distance apart, and means for adjustably moving one of said shafts with respect to the other whereby the sizes of said wheels may be changed but the wheels are nevertheless in driving relation, said last named means comprising a casing portion, an eccentric rotatably disposed in said casing portion and carrying said last named shaft, and a vernier adjusting mechanism for holding the eccentric in a plurality of different rotative positions within said casing portion and comprising a member having a plurality of different stations fixed with respect to said casing portion and a rotatable member having a different number of stations and fixed with respect to said eccentric, and means for fixing said last named member with any of its stations coincident with any of the stations of said first named member.

2. In power transmitting mechanism, the combination of a pair of spaced shafts, a wheel on each of said shafts, means interconnecting said wheels comprising cogs on the wheels and effective to put the wheels in driving relation to each other when the wheels are of predetermined sizes and said shafts are a predetermined distance apart, and means for adjustably moving one of said shafts with respect to the other whereby the sizes of said wheels may be changed but the wheels are nevertheless in driving relation, said last named means comprising a casing portion, an eccentric rotatably disposed in said casing portion and carrying said movable shaft, and a vernier adjusting mechanism for holding the eccentric in a plurality of different rotative positions within said casing portion and comprising means defining a plurality of spaced openings in said eccentric, means defining a plurality and different number of spaced openings in said casing portion, any of the openings in said eccentric being adapted to coincide with any of the openings in said casing portion with different rotative positions of the eccentric in the casing portion, and a pin adapted to extend through any of the openings in said eccentric and any of the openings in said casing portion coincident therewith.

3. In a power transmitting mechanism, the combination of a pair of spaced shafts, a wheel on each of said shafts, an endless belt extending around said wheels to put the wheels in driving relation to each other, and means for adjustably moving one of said shafts with respect to the other whereby the sizes of said wheels may be changed and the belt may be retained taut about said wheels and in driving relation with respect thereto, said means comprising a casing portion, an eccentric rotatably disposed in said casing portion and carrying said movable shaft, and a vernier adjusting mechanism for holding the eccentric in a plurality of different rotative positions within said casing portion comprising a member having a plurality of different stations fixed with respect to said casing portion and a rotatable member having a different number of stations and fixed with respect to said eccentric, and means for fixing said last named member with any of its stations coincident with any of the stations of said first named member.

4. In a power transmitting mechanism, the combination of a pair of spaced shafts, a wheel on each of said shafts, means interconnecting said wheels to put the wheels in driving relation to each other and including cogs on the wheels and an endless chain extending around the wheels and meshing with said cogs, and means for adjustably moving one of said shafts with respect to the other whereby the sizes of said wheels may be changed and said chain may be maintained taut about and in driving relation with said wheels, said means comprising a casing portion, an eccentric rotatably disposed in said casing portion and carrying said movable shaft, and a vernier adjusting mechanism for holding the eccentric in a plurality of different rotative positions within said casing portion and comprising means defining a plurality of spaced openings in said eccentric, means defining a plurality and different number of spaced openings in said casing portion, each of the openings in said eccentric being adapted to coincide with any of the openings in said casing portion with different rotative positions of the eccentric within the casing portion, and a screw adapted to extend through any of the openings in said eccentric and to be screwed into any of the openings in said casing portion coincident therewith.

5. In a power transmitting mechanism, the combination of a pair of spaced shafts, a wheel on each of said shafts, means interconnecting said wheels and effective to put the wheels in driving relation to each other when the wheels are of predetermined sizes and said shafts are a predetermined distance apart, and means for adjustably moving one of said shafts with respect to the others whereby the sizes of said wheels may be changed but the wheels are nevertheless in driving relation, said last named means comprising a casing portion, an eccentric rotatably disposed in said casing portion and a second eccentric rotatably disposed in said first named eccentric and carrying said movable shaft, and means for fixing said first named eccentric with respect to both said casing portion and said second eccentric.

6. In power transmitting mechanism, the combination of three spaced shafts, a wheel on a first one of said shafts, a pair of wheels connected together and disposed on a second one of said shafts, a wheel on the third one of said shafts, means interconnecting said first named wheel with one of said pair of wheels and means interconnecting the other of said pair of wheels with the wheel on said third shaft whereby said first named wheel may drive one of the pair of wheels and the other of the pair of wheels may drive the wheel on said third shaft, and means for adjustably moving said second shaft with respect to the other shafts whereby the sizes of said wheels may be changed and the wheels may be maintained in driving relation, said means comprising a casing portion, an eccentric rotatably disposed in said casing portion and a second eccentric rotatably disposed in said first named eccentric and carrying said second shaft, and means for fixing said first named eccentric with respect to both said casing portion and said second named eccentric.

7. In power transmitting mechanism, the combination of three spaced shafts, a wheel on a first one of said shafts, a pair of wheels connected together and disposed on a second one of said shafts, a wheel on the third one of said shafts, means interconnecting said first named wheel with one of said pair of wheels to put the wheels in driving relation with each other and means interconnecting the other of said pair of wheels with the wheel on said third shaft to put these wheels in driving relation with each other, and means for adjustably moving said second shaft with respect to the other shafts whereby the sizes of said wheels may be changed and the wheels may be retained in driving relation, said means comprising a casing portion, an eccentric rotatably disposed in said casing portion, a second eccentric rotatably disposed in said first named eccentric and carrying said second shaft, a vernier adjusting mechanism for holding said first named eccentric in a plurality of different rotative positions within said casing portion, and another vernier adjusting mechanism for holding said second eccentric in a plurality of different rotative positions within said first named eccentric.

8. In power transmitting mechanism, the combination of three spaced shafts, a wheel on a first one of said shafts, a pair of wheels connected together and disposed on a second one of said shafts, a wheel on the third one of said shafts, means interconnecting said first named wheel with one of said pair of wheels to put the wheels in driving relation to each other and means interconnecting the other of said pair of wheels and the wheel on said third shaft to put these wheels in driving relation to each other, said interconnecting means including cogs on each of said wheels and means for adjustably moving said second shaft with respect to the other shafts whereby the sizes of said wheels may be changed and the wheels may be maintained in driving relation, said means comprising a casing portion, an eccentric rotatably disposed in said casing portion, and a second eccentric rotatably disposed in said first named eccentric and carrying said second shaft, and a vernier adjusting mechanism between said first named eccentric and said casing portion for holding said first named eccentric in a plurality of different rotative positions within said casing portion and a vernier adjusting mechanism between said two eccentrics for holding said second eccentric in a plurality of different rotative positions within said first named eccentric, each of said vernier adjusting mechanisms comprising means defining a plurality of spaced openings in one of the two elements between which the mechanism is disposed and means defining a plurality and different number of spaced openings in the other of said elements, any of the openings in one of said elements being adapted to coincide with any of the openings in the other element depending on the relative rotative position of one element with respect to the other, and a pin adapted to extend through any of the openings in one of the elements and any of the openings in the other element coincident therewith.

9. In power transmitting mechanism, the combination of three spaced shafts, a wheel on a first one of said shafts, a pair of wheels connected together and disposed on a second one of said shafts, a wheel on the third one of said shafts, an endless belt extending around said first named wheel and one of said pair of wheels to put the wheels in driving relation to each other and another belt extending around the other of said pair of wheels and the wheel on said third shaft to put these wheels in driving relation to each other, and means for adjustably moving said second shaft with respect to the other shafts whereby the sizes of said wheels may be changed and said belts may be maintained taut about the wheels and in driving relation with respect thereto, said means comprising a casing portion, an eccentric rotatably disposed in said casing portion, and a second eccentric rotatably disposed in said first named eccentric and carrying said second shaft, and a vernier adjusting mechanism for holding said first named eccentric in a plurality of different rotative positions within said casing portion and another vernier adjusting mechanism for holding said second eccentric in a plurality of different rotative positions within said first named eccentric.

10. In power transmitting mechanism, the combination of three spaced shafts, a sprocket on a first one of said shafts, a pair of sprockets connected together and disposed on a second one of said shafts, a sprocket on the third one of said shafts, and an endless chain extending around said first named sprocket and one of said pair of sprockets to put the sprockets in driving relation to each other, an endless chain extending around the other of said pair of sprockets and the sprocket on said third shaft to put these sprockets in driving relation to each other, and means for adjustably moving said second shaft with respect to the other shafts whereby the sizes of said sprockets may be changed and said chains may be maintained taut about the sprockets and in driving relation with respect thereto, said means comprising a casing portion, an eccentric rotatably disposed in said casing portion, and a second eccentric rotatably disposed in said first named eccentric and carrying said second shaft, and a vernier adjusting mechanism between said first named eccentric and said casing portion for holding the eccentric in a plurality of different rotative positions within the casing portion and a vernier adjusting mechanism between said two eccentrics for holding said second eccentric in a plurality of different rotative positions within said first named eccentric, each of said vernier adjusting mechanisms comprising means defining a plurality of spaced openings in one of the elements between which the vernier mechanism is disposed, means defining a plurality and different number of spaced openings in the other of the elements, each of the openings in one of the elements being adapted to coincide with any of the openings in the other element depending on the rotative position of one element with respect to the other, and a screw adapted to extend through any of the openings in one of said elements and any of the openings in the other element coincident therewith and screwing into the openings in one of the elements.

ERNEST EARL WESSELHOFF.

REFERENCES CITED

The following references are of record in the file of this patent:

UNITED STATES PATENTS

| Number | Name | Date |
| --- | --- | --- |
| 1,218,686 | Morse | Mar. 13, 1917 |
| 844,892 | Pfander | Feb. 19, 1907 |

Certificate of Correction

Patent No. 2,426,960. September 2, 1947.

ERNEST EARL WESSELHOFF

It is hereby certified that error appears in the printed specification of the above numbered patent requiring correction as follows: Column 6, line 2, claim 3, after the word "portion" insert *and*; and that the said Letters Patent should be read with this correction therein that the same may conform to the record of the case in the Patent Office.

Signed and sealed this 11th day of November, A. D. 1947.

[SEAL]

THOMAS F. MURPHY,
*Assistant Commissioner of Patents.*